Feb. 16, 1932.  W. J. PETER  1,845,622
HYDRAULIC SYSTEM FOR STORING AND DISPENSING WATER
IMMISCIBLE LIQUIDS HEAVIER THAN WATER
Filed Feb. 5, 1929
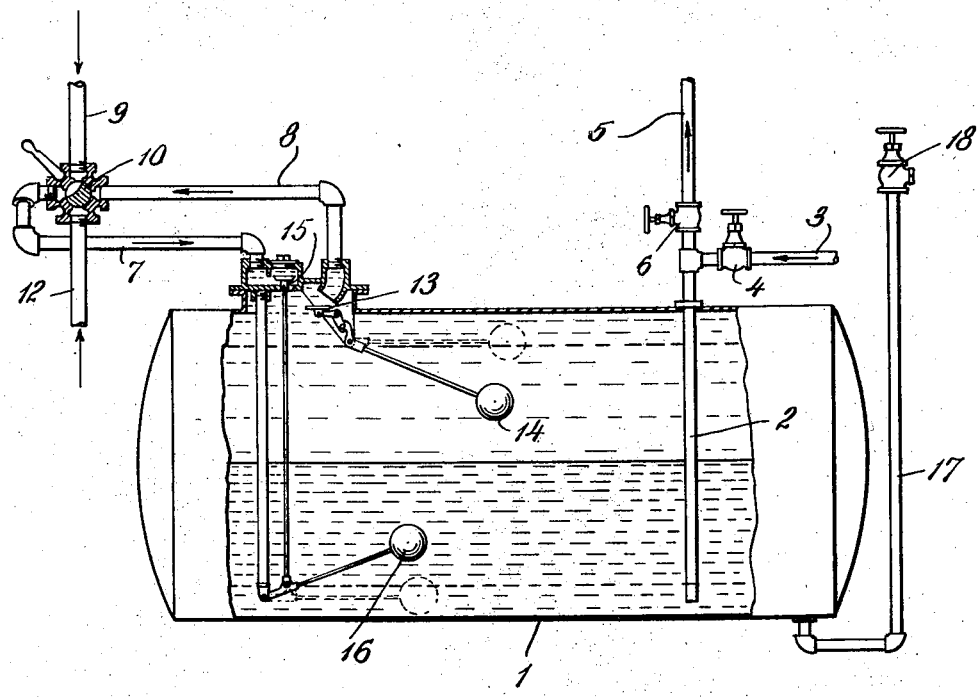
INVENTOR
William J. Peter
BY
Pennie, Davis, Marvin & Edmonds
his ATTORNEYS Patented Feb. 16, 1932

1,845,622

UNITED STATES PATENT OFFICE

WILLIAM J. PETER, OF NEW YORK, N. Y., ASSIGNOR, BY DIRECT AND MESNE ASSIGNMENTS, TO AQUA SYSTEMS INCORPORATED, OF NEW YORK, N. Y., A CORPORATION OF NEW YORK

HYDRAULIC SYSTEM FOR STORING AND DISPENSING WATER-IMMISCIBLE LIQUIDS HEAVIER THAN WATER

Application filed February 5, 1929. Serial No. 337,587.

This invention relates to hydraulic systems for storing and dispensing liquids heavier than water and immiscible therewith. In numerous patents which have been issued to me, I have disclosed hydraulic systems for storing and dispensing oils, or liquids lighter than water and immiscible therewith. In such systems the oil overlies the water and is forced out through a delivery pipe in the top of the storage tank by means of water forced in at the bottom. In filling the flow is reversed, the oil being added through an inlet pipe entering the top of the tank while the water passes out from the bottom and flows to waste. When dealing with a liquid heavier than water the fundamental problems of liquid flow are the same as when dealing with a liquid lighter than water, but the fact that in the latter case the dispensing liquid, the water, lies below the liquid being dispensed, while in the former the positions of the two are reversed, necessitates certain changes in the system when dealing with heavy liquids. It is the object of the present invention to provide a hydraulic system adapted for dispensing liquids heavier than water.

In the single figure of the accompanying drawing, I have illustrated, more or less diagrammatically as a preferred embodiment of my invention, a hydraulic system designed primarily for storing and dispensing carbon bisulfide. In this drawing, 1 represents the ordinary storage tank. Carbon bisulfide, or other liquid heavier than water and immiscible therewith, is fed to the tank and conducted therefrom through a pipe 2 which extends from the top of the tank to a point closely adjacent its bottom. The carbon bisulfide is fed to pipe 2 through a fill pipe 3 provided with a manually controlled valve 4, and is discharged from the tank through a delivery pipe 5 provided with a similar manually controlled valve 6. Water is fed to the tank through a pipe 7 and discharged from the tank through a pipe 8. During the delivery of carbon bisulfide, pipe 7 is placed in communication with a pipe 9 through which water is supplied at any desired pressure, either from the city mains or from a float box. This communication between pipes 7 and 9 is effected by means of a manually controlled valve 10. During tank filling the discharge pipe 8 is placed in communication with the sewer through a drain pipe 12, this communication also being effected by means of the valve 10. In the position of the valve illustrated, pipes 9 and 7 are in communication. By rotating the valve through 180° the pipes 8 and 7 are placed in communication.

In order to prevent overfilling of the tank with carbon bisulfide, I have provided the pipe 8 with a control valve 13 which is operated automatically by means of a float 14 designed to float on carbon bisulfide and sink in water. Thus, when the level of the carbon bisulfide reaches any predetermined high point, such as the broken line position illustrated, the float acts to close the valve 13 and cut off the flow. When the valve 13 has been closed further influx of carbon bisulfide is rendered impossible and hence none of the liquid can follow the water to the sewer.

During normal operation of the system in delivering carbon bisulfide, means should be provided for preventing the water from following the carbon bisulfide to the delivery point. I therefore provide the pipe 7 with a control valve 15 which, through suitable connections with a float 16 designed to float on carbon bisulfide and sink in water, is closed when the carbon bisulfide level reaches a predetermined low point, such as the broken line position illustrated.

In order to prevent sediment from passing upward through the pipe 2 this pipe terminates a short distance above the bottom of the tank, as illustrated. In order to flush the bottom of the tank I have provided a clean-out pipe 17 entering through the bottom of the tank and provided with a valve 18. When it is desired to flush the tank, the valve 15 is held open, the valves 4 and 6 closed, and the valve 18 opened. Water is then forced through the tank and out through the clean-out pipe carrying the sediment with it.

I claim:

1. In a hydraulic system for storing and delivering liquids heavier than water and immiscible therewith, the combination of a tank, a delivery pipe for the heavy liquid communicating with the tank near its bottom, a water inlet pipe, means for forcing water through the inlet pipe to force the heavy liquid out, a valve in the water pipe, and means for automatically closing the valve when the heavy liquid level reaches a predetermined low point.

2. In a hydraulic system for storing and delivering liquids heavier than water and immiscible therewith, the combination of a tank, a delivery pipe for the heavy liquid communicating with the tank near its bottom, a water inlet pipe, means for forcing water through the inlet pipe to force the heavy liquid out, a valve in the water pipe, and a float within the tank designed to float on the heavy liquid and sink in water for automatically closing the valve when the heavy liquid level reaches a predetermined low point.

3. In a hydraulic system for storing and delivering liquids heavier than water and immiscible therewith, the combination of a tank, means for conducting the heavy liquid to and from the tank, a water inlet pipe communicating with the top of the tank, a water discharge pipe communicating with the top of the tank, a source of hydraulic pressure, a waste pipe, and means for placing the water inlet pipe in communication with the source of hydraulic pressure to force the heavy liquid from the tank while simultaneously closing communication between the water discharge and waste pipes, and for closing communication between the water inlet pipe and the source of pressure while simultaneously opening communication between the water discharge and waste pipes to permit discharge of water during tank filling, valves in the water inlet and discharge pipes and floats designed to float on the heavy liquid and sink in water connected to the valves whereby the valve in the inlet pipe is closed when the heavy liquid level reaches a predetermined low point and the valve in the discharge pipe is closed when the heavy liquid level reaches a predetermined high point.

In testimony whereof I affix my signature.

WILLIAM J. PETER.